United States Patent [19]

Naruse et al.

[11] Patent Number: 4,571,316

[45] Date of Patent: Feb. 18, 1986

[54] METHODS OF FORMING MULTILAYER COATED FILM

[75] Inventors: Yasuhito Naruse; Yuzo Inukai, both of Shizuoka, Japan

[73] Assignee: Fuji Photo Film Co., Ltd., Kanagawa, Japan

[21] Appl. No.: 599,360

[22] Filed: Apr. 12, 1984

[30] Foreign Application Priority Data

Apr. 12, 1983 [JP] Japan ................................. 58-64034

[51] Int. Cl.[4] ............................................ B29C 35/08

[52] U.S. Cl. ...................................... 264/22; 264/1.4; 264/171; 427/44; 427/48

[58] Field of Search ...................... 264/22, 26, 1.4, 25, 264/212, 1.6, 171; 427/40, 44, 48; 118/410, 411; 425/113, 133.5

[56] References Cited

U.S. PATENT DOCUMENTS

| | | | |
|---|---|---|---|
| 3,471,360 | 10/1969 | Newman | 264/212 |
| 3,526,528 | 9/1970 | Takahashi et al. | 425/113 |
| 3,658,620 | 4/1972 | Hall | 264/22 |
| 4,407,853 | 10/1983 | Okita et al. | 427/48 |
| 4,468,436 | 8/1984 | Okita et al. | 427/44 |
| 4,469,782 | 9/1984 | Ishiwata et al. | 264/176 R |
| 4,481,231 | 11/1984 | Hashimoto et al. | 427/44 |
| 4,482,578 | 11/1984 | Akashi et al. | 427/44 |
| 4,490,418 | 12/1984 | Yoshida | 118/410 |

FOREIGN PATENT DOCUMENTS

| | | | |
|---|---|---|---|
| 58-134172 | 8/1983 | Japan | 264/22 |
| 2078157A | 1/1982 | United Kingdom | 264/171 |

*Primary Examiner*—Jeffery Thurlow
*Attorney, Agent, or Firm*—Sughrue, Mion, Zinn, Macpeak & Seas

[57] ABSTRACT

A method of forming a multilayer coated film comprising applying two or more nonaqueous layers to a continuously traveling flexible web, wherein at least one of the two or more coated layers comprises a coating composition containing an electron beam hardenable resin, and at least one of the two or more coated layers has a viscosity of about 100 cps or more, and irradiating the two or more coated layers with electron beams to harden the coated layers or increase the viscosity thereof, and thereafter drying the coated layers is disclosed.

3 Claims, 3 Drawing Figures

METHODS OF FORMING MULTILAYER COATED FILM

FIELD OF THE INVENTION

The present invention relates to a method of forming a multilayer coated film and, in greater detail, to a method of forming a coated film which comprises applying two or more nonaqueous layers to a long flexible support (hereinafter, referred to as "web") which travels continuously to form a coated film without mixing between two layers occurring.

BACKGROUND OF THE INVENTION

Hitherto, in aqueous solution systems, it is known to use a method of forming a coated film which comprises simultaneously applying silver halide emulsions containing gelatin as a binder using a slide hopper coating apparatus or an extrusion hopper coating apparatus, etc., to form a multilayer film, gelatinizing the multilayer film utilizing the gel-sol conversion characteristics of gelatin by cooling or using cold air to produce a superhigh viscosity state where the viscosity is in the tens of thousands to hundreds of thousands cps range. This makes it difficult for mixing between layers to occur. Subsequently, hot air, etc., is used for drying.

On the other hand, in organic solvent systems, when multilayer application and drying are merely carried out, diffusion and mixing easily occur not only in the drying zone but also in the bead forming area of the applied multilayer during application and drying, because of the low surface tension as compared with that of an aqueous solution system. Further, diffusion and mixing occur during drying because there is no sol-gel conversion process. As a result, it is very difficult to obtain a coated film where each layer is in a separated state.

Further, in the organic solvent systems, no good sol-gel conversion substance can be used in various kinds of solvents and no other effective method is available. Therefore, multilayer application or coating using organic solvent systems has been carried out by methods comprising applying or coating layers one after another and drying successively.

Successive application drying processes include a method which comprises rolling up the coated material after each application and drying or a method which comprises continuously applying and drying using a plurality of application drying devices. However, the former method involves a long production time and, consequently, a large production cost arises. In the latter method, very expensive equipment for production must be used because an application device and the drying device corresponding to each layer are required. Consequently, the production cost is high.

Recently, several methods of forming a coated film in which a hardening phenomenon of the coated film by irradiation of electron beams is utilized have been proposed. Japanese Patent Publication No. 19894/79 and Japanese Patent Application (OPI) No. 38160/81 (the term "OPI" as used herein refers to a "published unexamined Japanese patent application") disclose the above-described methods of forming a monolayer coated film, and Japanese Patent Publication No. 16403/78 and Japanese Patent Application (OPI) No. 24384/83 disclose the above-described methods of forming a multilayer coated film. However, they do not essentially solve the above-described problems, because active rays are irradiated successively after application of coated layers one by one in case of a multilayer coated film.

SUMMARY OF THE INVENTION

An object of the present invention is to provide a method of forming a coated film at a very low cost as compared with the methods of forming a nonaqueous multilayer coated film which involve a high cost.

The above-described object of the present invention can be attained by a method of forming a coated film which comprises applying two or more nonaqueous layers to a continuously traveling flexible web where at least one of the two or more coated layers comprises a coating composition containing a resin hardenable using electron beams, and at least one of the two or more coated layers has a viscosity of 100 cps or more, and irradiating the two or more coated layers with electron beams after multilayer application to thereby harden the coated layers or increase the viscosity thereof, and thereafter drying the coated layers.

BRIEF DESCRIPTION OF THE DRAWINGS

figures 1 represents a coating head, 3 represents a web, 11 represents an electron beam irradiating device, and 12 represents a drying device.

DETAILED DESCRIPTION OF THE INVENTION

The contents of the present invention are illustrated in greater detail by reference to the accompanying drawings.

Figure 1:
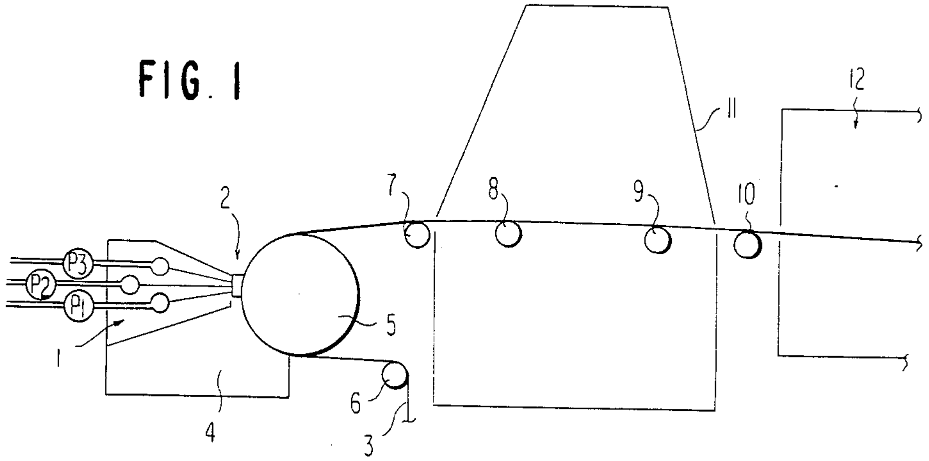
FIG. 1 is a side section of an apparatus for practicing the method of forming a coated film according to the present invention.

In FIG. 1, two or more kinds of nonaqueous coating solutions are fed to a coating head 1 from liquid reservoirs, which are not shown in the drawing, by quantitative liquid transfer pumps $P_1$ and $P_2$ or $P_1$, $P_2$ and $P_3$, etc. These coating solutions are applied to a continuously traveling web 3 at an extrusion bead forming area 2. The web preferably travels at a rate of 30 m/min. to 100 m/min. 5 is a backing roller for application zone, and 6, 7, 8, 9 and 10 are pass rollers. Further, 4 is a vacuum chamber where a reduced pressure is maintained by a vacuum pump, which is not shown in the drawing, to stabilize the beads. 11 is an electron beam irradiating device, and 12 is a drying device. In this process, at least one of the two or more nonaqueous coating solutions is a coating composition containing an electron beam hardenable resin, and at least one of the coating solutions has a viscosity of about 100 cps or more.

When at least one of the coating solutions has a viscosity of about 100 cps or more, preferably 200 cps or more, diffusion and mixing in the multilayer coated film formed in the extrusion bead forming area 2 which occur on the way to the electron beam irradiating device 11 are prevented. Further, by irradiation with electron beams in the electron beam irradiating device 11, the layer containing an electron beam hardenable resin has a high viscosity (the viscosity heightens to about ten times more than before irradiation) or is hardened and, thereafter, it is heated in the drying device 12 (preferably at a temperature of 50° to 120° C.) to result in a dried layer. Therefore, diffusion and mixing between layers in the multilayer coated film in the drying device 12 is prevented and formation of the desired coated film is carried out by passing through the drying device 12.

The time until arrival at the electron beam irradiating device 11 after formation of the multilayer coated film in the extrusion bead forming area 2 is related to the properties of the coating solutions, but the time preferably is within 5 seconds from the viewpoint of preventing diffusion and mixing. As a coating device, a slide bead type coating device is preferably used. Also, as a drying device, an arch type, a herical air cushion type or a drum type drying device is preferably used.

As electron beam hardenable resins suitable for use in the present invention, there are, for example, electron beam polymerizable compounds having an unsaturated bond or an epoxy group such as compounds having at least one and preferably two or more groups selected from a vinyl group, a vinylidene group and an epoxy group; compounds having an acryloyl group, a methacryloyl group, an acrylamide group, an allyl group, a vinyl ether group, or a vinyl thioether group, an unsaturated polyester or an epoxy resin.

Especially preferable compounds are those having an acryloyl group or methacryloyl group at both ends of their molecular chain which are disclosed in A. Vrancken, "Fatipec Congress", 11, 19 (1972). As examples of these compounds, there are compounds represented by the formula:

pentaerythritol triacrylate, ethylene glycol dimethacrylate, pentaerythritol tetramethacrylate, dipentaerythritol hexaacrylate, etc., and unsaturated esters having an epoxy ring such as glycidyl methacrylate are preferable.

Preferred examples of solvents for preparing coating solutions containing the electron beam hardenable resins include water, an alcohol such as methanol or ethanol, ethylene glycol monomethyl ether acetate, dimethylformamide, diethylformamide, dichloroethane, methyl ethyl ketone, cyclohexanone, toluene and a mixture thereof. When a compound which is a liquid state at an ordinary temperature such as acrylic acid or styrene is used as the electron beam hardenable resin, it is not necessary to use another solvent. The amount of the electron beam hardenable resin in the coating solution is generally about 5 to 50% by weight. When the amount of the electron beam hardenable resin in the coated layer after curing is less than 2% by weight, desired effects of the present invention cannot be obtained.

The irradiation amount of the electron beam used in the present invention is preferably in the range of from 0.08 to 10 Mrad, and more preferably 0.5 to 3 Mrad.

The coating solution having a viscosity of about 100 cps or more used in the present invention can be prepared by controlling the concentration of a resin contained. As the resin to be contained in the coating solution above, any kind of resin can be used according to $$CH_2{=}CH{-}CO_2{-}CH_2\underset{\underset{OH}{|}}{C}HCHO{\leftarrow}COCH_2CH_2CO_2CH_2\underset{\underset{OH}{|}}{C}HCH_2O{\rightarrow_n}COCH{=}CH_2,$$

compounds represented by the above formula in which the polyester chain is replaced by a polyurethane chain, a polyepoxide chain, a polyether chain, a polycarbonate chain or a mixture chain thereof, and compounds represented by the above formula in which the end group is replaced by a methacryloyl group. These compounds preferably have a molecular weight of the range of about 500 to 20,000. Aronix M6100 and Aronix M7100 (both are manufactured by Toa Gosei Chemical Industry Co., Ltd.) correspond to the above-described compounds.

Other preferred examples of the electron beam hardenable resins include unsaturated monomer compounds, for example, acrylic acid, methacrylic acid, itaconic acid, an alkyl acrylate such as methyl acrylate, an alkyl methacrylate such as methyl methacrylate, styrene, a styrene derivative such as $\alpha$-methylstyrene or $\beta$-chlorostyrene, acrylonitrile, methacrylonitrile, acrylamide, methacrylamide, vinyl acetate, vinyl propionate and compounds having two or more unsaturated double bonds.

In addition, compounds described in *Corrected Data of Light-Sensitive Resins,* published by Kabushiki Kaisha Sogo Kagaku Kenkyusho, Japan, December, 1968, pp. 235–236 can also be used as the electron beam hardenable resins of the present invention. Among them, unsaturated ester of polyhydric alcohols such as 2-hydroxyethyl acrylate, 2-hydroxyethyl methacrylate, ethylene glycol diacrylate, butoxyethyl acrylate, 1,4-butanediol diacrylate, 1,6-hexanediol acrylate, stearyl acrylate, 2-ethylhexyl acrylate, tetrahydrofurfuryl methacrylate, diethylene glycol diacrylate, diethylene glycol dimethacrylate, tetraethylene glycol diacrylate, neopentyl glycol methacrylate, neopentyl glycol diacrylate, glycerol trimethacrylate, trimethylolpropane triacrylate, the kind of desired multilayer coated film in the present invention. The electron beam hardenable resins described before can also be used as the resin for preparing the coating solution having a viscosity of about 100 cps or more.

Figure 2:
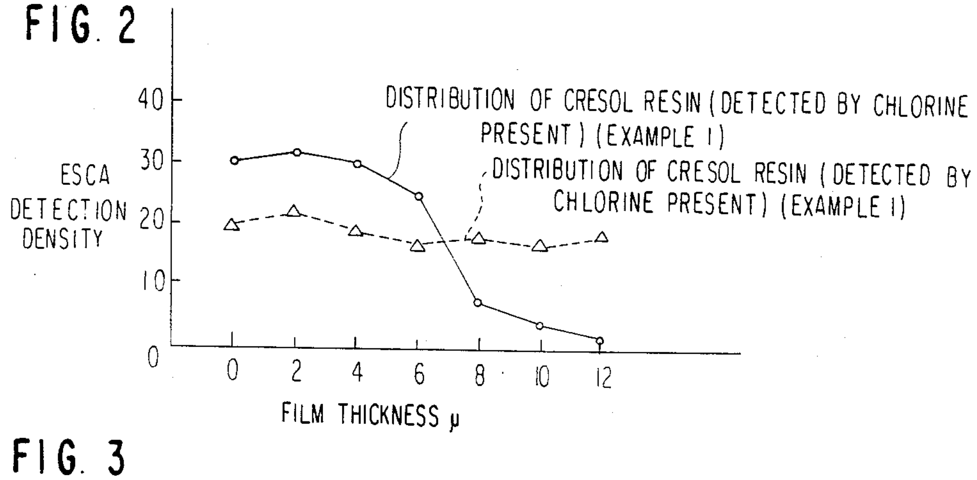
FIG. 2 and FIG. 3 are characteristic graphs showing the effect of the present invention, wherein in these
Figure 3:
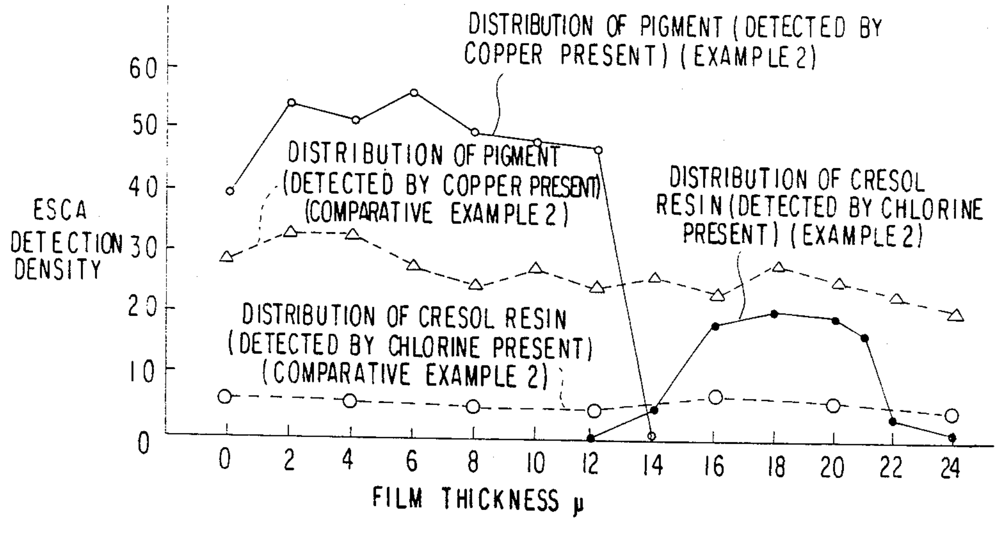

FIG. 2 and FIG. 3 are characteristic graphs showing the effect of the present invention, which are based on the following examples. Unless otherwise indicated in the following examples, all parts, percents, ratios and the like are by weight.

EXAMPLE 1

Using an apparatus shown in FIG. 1, coating solutions having the composition and properties shown in Table 1 below were applied in layers to a polyethylene terephthalate film having a width of 1,500 mm and a thickness of 150 $\mu$m traveling at a rate of 50 m per minute so that the coating amounts of the upper and lower layers were 10 cc/m$^2$, respectively. One second after the application, irradiation with electron beams was carried out using electron beam irradiating device 11 so as to have an acceleration voltage of 200 KV and an exposure of 3 Mrad, and drying was then carried out by heating in drying device 12.

TABLE 1

| Composition of upper layer coating solution | | |
|---|---|---|
| Cresol Resin | 42 | parts (containing chlorine) |
| Polyester Acrylate | 8 | parts (containing chlorine) |
| Cellosolve Acetate | 40 | parts (containing chlorine) |
| Methyl Ethyl Ketone | 10 | parts |

TABLE 1-continued

| | | |
|---|---|---|
| | (containing chlorine) | |
| Fluorine Containing | 0.1 parts (containing chlorine) | |
| Surfactant | | |
| Composition of lower layer coating solution: | | |
| Phenol Resin | 40 parts | |
| Polyester Acrylate | 10 parts | |
| Cellosolve Acetate | 40 parts | |
| Methyl Ethyl Ketone | 10 parts | |
| Viscosity of upper layer coating solution: | | 180 cps |
| Viscosity of lower layer coating solution: | | 120 cps |

COMPARATIVE EXAMPLE 1

Using the apparatus as described in Example 1 for application and drying, coating solutions having the composition and properties shown in Table 2 below were applied in layers to a polyethylene terephthalate film having a width of 1,500 mm and a thickness of 150 μm traveling at a rate of 50 m per minute in a manner similar to that in Example 1 so that the coating amounts of the upper and lower layers were 16.7 cc/$m^2$, respectively, and drying was carried out with heating.

TABLE 2

| | | |
|---|---|---|
| Composition of upper layer coating solution: | | |
| Cresol Resin | 30 parts (containing chlorine) | |
| Cellosolve Acetate | 54 parts (containing chlorine) | |
| Methyl Ethyl Ketone | 16 parts (containing chlorine) | |
| Fluorine Containing | 0.1 parts (containing chlorine) | |
| Surfactant | | |
| Composition of lower layer coating solution: | | |
| Phenol Resin | 30 parts | |
| Cellosolve Acetate | 54 parts | |
| Methyl Ethyl Ketone | 16 parts | |
| Viscosity of upper layer coating solution: | | 80 cps |
| Viscosity of lower layer coating solution: | | 50 cps |

The dried film thickness of the dried coated film obtained in Example 1 and that obtained in Comparative Example 1 were the same.

These dried films were examined by shaving the film using ESCA (Electron Spectroscopy for Chemical Analysis) and chlorine in cresol resin present in the upper layer was analyzed. The distribution of the amount detected is shown in FIG. 2. In FIG. 2, the solid line shows the result for the sample in Example 1, and the dotted line shows the result of measuring the sample in Comparative Example 1. It can be seen that, since the coating solution in Table 1 contains polyester acrylate which is an electron beam hardenable resin and has a viscosity of more than 100 cps, the cresol resin of the sample obtained in Example 1 remains in an unevenly distributed state as shown by the solid line in FIG. 2. It can be seen that, since the coating solution in Table 2 does not contain an electron beam hardenable resin and has a viscosity of less than 100 cps, the cresol resin in the sample obtained in Comparative Example 1 is distributed throughout all layers by diffusion and mixing as shown by the dotted line in FIG. 2.

EXAMPLE 2

Using an apparatus shown in FIG. 1, coating solutions having the composition and properties shown in Table 3 below were applied in layers to a polyethylene terephthalate film having a width of 1,000 mm and a thickness of 200 μm traveling at a rate of 50 m per minute so that the coating amounts of the top layer, intermediate layer and the lowest layer were 20 cc/$m^2$, 15 cc/$m^2$ and 5 cc/$m^2$, respectively. Four seconds after the application, irradiation with electron beams was carried out using an electron beam irradiating apparatus 11 so as to have an acceleration voltage of 250 KV and an exposure of 2.5 Mrad. Drying was then carried out by heating in a drying device 12.

TABLE 3

| | | |
|---|---|---|
| Composition of top layer coating solution | | |
| Polyester Acrylate | 8 parts | |
| Phenol Resin | 42 parts | |
| Pigment | 2 parts (containing copper) | |
| Cellosolve Acetate | 36 parts | |
| Methyl Ethyl Ketone | 12 parts | |
| Composition of intermediate layer coating solution: | | |
| Polyester Acrylate | 9 parts | |
| Cresol Resin | 45 parts (containing chlorine) | |
| Cellosolve Acetate | 35 parts | |
| Methyl Ethyl Ketone | 11 parts | |
| Composition of lowest layer coating solution: | | |
| Phenol Resin | 30 parts | |
| Cellosolve Acetate | 54 parts | |
| Methyl Ethyl Ketone | 16 parts | |
| Viscosity of top layer coating solution | | 280 cps |
| Viscosity of intermediate layer coating solution: 220 cps | | |
| Viscosity of lowest layer coating solution: | | 50 cps |

COMPARATIVE EXAMPLE 2

Using the apparatus as described in Example 2 for application and drying, coating compositions having the composition and properties shown in Table 4 below were applied in layers to a polyethylene terephthalate film having a width of 1,000 mm and a thickness of 200 μm traveling at a rate of 50 m per minute in a manner similar to Example 2 so that the coating amounts of the top layer, the intermediate layer and the lowest layer were 26.7 cc/$m^2$, 21.1 cc/$m^2$ and 5 cc/$m^2$, respectively. Drying was carried out by heating.

TABLE 4

| | | |
|---|---|---|
| Composition of top layer coating solution: | | |
| Phenol Resin | 31.5 parts | |
| Pigment | 1.5 parts (containing copper) | |
| Cellosolve Acetate | 50 parts | |
| Methyl Ethyl Ketone | 17 parts | |
| Composition of intermediate layer coating solution: | | |
| Cresol Resin | 32 parts (containing chlorine) | |
| Cellosolve Acetate | 51 parts (containing chlorine) | |
| Methyl Ethyl Ketone | 17 parts (containing chlorine) | |
| Composition of lowest layer coating solution: | | |
| Phenol Resin | 30 parts | |
| Cellosolve Acetate | 54 parts | |
| Methyl Ethyl Ketone | 16 parts | |
| Viscosity of top layer coating solution: | | 80 cps |
| Viscosity of intermediate layer coating solution: | | 85 cps |
| Viscosity of lowest layer coating solution: | | 50 cps |

Distributions of the resin and the pigment in layers of the dried coated film obtained in Example 2 were examined by measuring the chlorine and copper present in the layers respectively by means of ESCA in a manner similar to Example 1. The results obtained are shown as solid lines in FIG. 3.

Likewise, the results of analysis of the dried coated film obtained in Comparative Example 2 by means of ESCA are shown as dotted lines in FIG. 3.

As is obvious from the results shown in FIG. 3, according to the method of forming a coating film by merely applying the layers and drying, the cresol resin or the pigment is uniformly distributed throughout all layers. On the contrary, according to the method of the present invention, both of them are in an unevenly distributed state in the original layers, which clearly means the effect of the present invention is obtained.

According to the present invention, the process is simplified and the cost reduced in multilayer application of nonaqueous coating solutions, because a multi-layer coated film is formed while diffusion and mixing between layers are prevented as confirmed in the above-described examples.

Examples of suitable webs which can be used in the present invention include papers, synthetic resin films, metals, resin coated papers and synthetic papers, etc. Suitable materials which can be used for the synthetic resin films are, for example, polyolefins such as polyethylene or polypropylene, etc., vinyl polymers such as polyvinyl acetate, polyvinyl chloride or polystyrene, etc., polyamides such as 6,6-nylon or 6-nylon, etc., polyesters such as polyethylene terephthalate or polyethylene-2,6-naphthalate, etc., polycarbonates and cellulose acetates such as cellulose triacetate or cellulose diacetate, etc. Further, typical resins which can be used for resin coated papers are polyolefins including polyethylene, but these resins are merely exemplary and are not limiting. Among them, a polyethylene terephthalate film and an aluminum film are especially suitable.

The present invention is not limited to the above specific examples, but it can be employed for slide bead coating, hopper slide coating and curtain coating, etc.

While the invention has been described in detail and with reference to specific embodiments thereof, it will be apparent to one skilled in the art that various changes and modifications can be made therein without departing from the spirit and scope thereof.

What is claimed is:

1. A method of forming a nonaqueous multilayer coated film comprising applying two or more nonaqueous layers to a continuously traveling flexible web, wherein at least one of the two or more coated layers comprises a coating composition containing an electron beam hardenable resin, and at least one of the two or more coated layers has a viscosity of about 100 cps or more, and irradiating the two or more coated layers with electron beams to harden the coated layers or increase the viscosity thereof, and thereafter drying the coated layers.

2. A method of forming a nonaqueous multilayer coated film as claimed in claim 1, wherein the electron beams are irradiated in an amount of the range from about 0.08 to 10 Mrad.

3. A method of forming a nonaqueous multilayer coated film as claimed in claim 1, wherein the flexible web travels at a rate of the range of from about 30 m/min. to 100 m/min.

* * * * *